(12) United States Patent
Bergenwall et al.

(10) Patent No.: US 7,734,683 B1
(45) Date of Patent: Jun. 8, 2010

(54) METHOD FOR PROVIDING A DNS SERVER ADDRESS LIST FROM A SERVER TO A CLIENT

(75) Inventors: Martin Bergenwall, Espoo (FI); Jan Zenner, Helsinki (FI)

(73) Assignee: Nokia Corporation, Espoo (FI)

( * ) Notice: Subject to any disclaimer, the term of this patent is extended or adjusted under 35 U.S.C. 154(b) by 1085 days.

(21) Appl. No.: 10/332,409

(22) PCT Filed: Jul. 11, 2000

(86) PCT No.: PCT/EP00/06542

§ 371 (c)(1),
(2), (4) Date: Feb. 24, 2003

(87) PCT Pub. No.: WO02/05510

PCT Pub. Date: Jan. 17, 2002

(51) Int. Cl.
*G06F 15/16* (2006.01)
(52) U.S. Cl. .................. 709/203; 709/219; 709/223; 709/224; 709/225; 709/229
(58) Field of Classification Search ......... 709/217–219, 709/223–224, 203
See application file for complete search history.

(56) References Cited

U.S. PATENT DOCUMENTS 5,740,371 A 4/1998 Wallis ................. 395/200.59
5,974,453 A * 10/1999 Andersen et al. ............ 709/220
6,014,698 A * 1/2000 Griffiths ................. 709/224

(Continued)

FOREIGN PATENT DOCUMENTS

WO WO 00/26807 5/2000

OTHER PUBLICATIONS

Alexander S, Droms R: "DHCP Options and BOOTP Ventor Extensions" Network Working Group, Request for Comments: 2132, 'Online! XP002162747 Retrieved from the Internet: URL:ftp://ftp.isi.edu/in-notes/rfc2132.txt 'retrieved on Mar. 13, 2001, cited in the application p. 7, paragraph 3.8.

(Continued)

*Primary Examiner*—Shawki S Ismail
(74) *Attorney, Agent, or Firm*—Alston & Bird LLP

(57) ABSTRACT

The invention relates to a method for providing a DNS server address list from a server 1 to a client 2 comprising the steps of: the client 2 requests an IP address from the server 1; and the server 1 responds by assigning the IP address together with said DNS address list to the client 1. In the prior art the order of the DNS server addresses in the list is static, that means that upon any IP request the same list, having the same order of addresses is provided to the client. When the client wants to output a DNS request he starts by asking the first server in the list irrespective as to whether said server may currently be overloaded or has gone down. In these situations time is lost since no response is provided by such a disturbed DNS server to a DNS request and the client has to ask another server in the list. In order to overcome these disadvantages the order of the DNS server addresses in the list is dynamically updated in that the client always knows which of the available DNS servers is currently best appropriated.

5 Claims, 3 Drawing Sheets

U.S. PATENT DOCUMENTS

| | | | |
|---|---|---|---|
| 6,092,178 A * | 7/2000 | Jindal et al. | 712/27 |
| 6,578,066 B1 * | 6/2003 | Logan et al. | 718/105 |
| 6,829,654 B1 * | 12/2004 | Jungck | 709/246 |
| 6,920,498 B1 * | 7/2005 | Gourlay et al. | 709/227 |
| 7,003,555 B1 * | 2/2006 | Jungck | 709/219 |
| 7,032,031 B2 * | 4/2006 | Jungck et al. | 709/246 |
| 7,086,061 B1 * | 8/2006 | Joshi et al. | 718/105 |
| 7,188,175 B1 * | 3/2007 | McKeeth | 709/227 |
| 2003/0195984 A1 * | 10/2003 | Zisapel et al. | 709/238 |
| 2004/0017798 A1 * | 1/2004 | Hurtta et al. | 370/352 |
| 2004/0078487 A1 * | 4/2004 | Cernohous et al. | 709/245 |
| 2004/0083306 A1 * | 4/2004 | Gloe | 709/245 |
| 2004/0103194 A1 * | 5/2004 | Islam et al. | 709/225 |
| 2005/0022203 A1 * | 1/2005 | Zisapel et al. | 718/105 |

OTHER PUBLICATIONS

R. Droms: "Dynamic Host Configuration Protocol", Network Working Group, Request for Comments: 2131, Mar. 1997, pp. 1-45.

P. Mockapetris: "Domain Names—Concepts and Facilities", Network Working Group, Request for Comments: 1034, Nov. 1987. pp. 1-55.

P. Mockapetris: "Domain Names—Implementation and Specification", Network Working Group, Request for Comments: 1035, Nov. 1987, pp. 1-55.

* cited by examiner

METHOD FOR PROVIDING A DNS SERVER ADDRESS LIST FROM A SERVER TO A CLIENT

PRIORITY CLAIM

This is a national stage of PCT application No. PCT/EP00/06542, filed on Jul. 11, 2000. Priority is claimed on that application.

BACKGROUND OF THE INVENTION

The invention relates to a method for providing a DNS (DNS: Domaine name system) server address list from a server to a client, comprising the steps of:

The client requests an IP (IP: Internet protocol) address from the server and the server responses by assigning the IP address together with said DNS address list to the client.

Such a method is known in the art, in particular for systems providing access to the internet or an intranet. Such a system is shown in FIG. 3. The system comprises an ADSL terminal 1, herein after referred to as Mxx (ADSL: Asynchronous digital subscriber line). The terminal 1 is running a DHCP server (DHCP: Dynamic host configuration protocol), herein after referred to just as server and acts like a router or bridge between a client 2 and the internet or intranet. In FIG. 3 the internet or intranet is represented by DNS servers 3 (DNS: Domain name system).

The Mxx makes several DNS servers—being i.e. associated with different networks—available for each client. There might also be a DNS proxy associated with the Mxx. The DNS proxy is not a real DNS server but looks like such a DNS server towards the client. The DNS proxy forwards a DNS request to a real DNS server in the internet or an intranet and forwards the co-ordinated response from said DNS server back to the client.

The operation of such a system partly corresponds to the method described above, wherein a list of DNS server addresses is provided by the server to the client upon request of an IP address.

According to the prior art said list is statically configured, i.e. upon each request the same list in which the DNS server addresses are listed in the same or fix order is provided to the client. Said list may be configured in the client or obtained from the server. Anyway, in the case that the client wants to put a DNS request to the internet or intranet the client looks up the list and starts by asking the first DNS server in the list as to whether it is ready for responding the DNS request. The first server in the list is designated to be the best available DNS server. If the first DNS server in the list does not respond the client goes to the second DNS server in the list and tries to get a response to a DNS request from the second server etc.

However, with statical configuration of the DNS server address list available to the client according to prior art there is the risk that a DNS server is still mentioned first in the list, that means is still being designated as the best available DNS server, although it has gone down in the meantime. In that case the client would nevertheless first ask the DNS server mentioned at the first position in the list although it has already gone down because it has not been removed from the first place in the list. In that way time is lost and the delay time for receiving a response to a DNS request increases for the client due to the statical configuration of the DNS server address list. Moreover, statical configuration of said list can make certain DNS servers overloaded although other DNS servers would be able to respond more quickly.

SUMMARY OF THE INVENTION

Regarding that situation it is the object of the invention to improve the method for providing a DNS server address list form a server to a client in the way that the delay time between a DNS request and the co-ordinated response from the server is reduced.

Said object is solved by the subject matter of claim 1 in the way that the order of the DNS server addresses in the list provided to the client is updated according a predetermined criterion.

According to the invention the order of the DNS server addresses in said list is dynamically optimised and updated so that the client is always informed about which of the currently available DNS servers is the best, i.e. is able to respond most quickly and/or must reliable. The best DNS server in the list is preferably put on a predetermined location in the list. Due to the updating of the list the risk that the client at first asks a server which is slow or has gone down has been minimised. To the contrary since the list is updated the client will most likely at first pick up the currently best available DNS server from the list and in that way there is no time lost for checking unappropriate DNS servers. Consequently, the delay time between a DNS request and its coordinated response is minimised for the client.

According to a first embodiment of the invention for updating the list the server acting as DNS proxy regularly sends at least one test request to each available DNS server and evaluates the co-ordinated responses in the view of that predetermined criterion. That way of acting has the advantage that the list is regularly updated.

It is further advantageous that for updating the list the server monitors at least some of the DNS requests directed by the client via the server directly to several DNS servers and evaluates the coordinated responses in the view of said predetermined criterion. That order of operation has the advantage that no test requests must be generated and used and further that no additional time or computational effort is required for updating the list as it would be required when test requests would be used.

Finally it is advantageous to take the servers speed and/or the reliability of the servers responses as the criterion for updating the order of the DNS servers addresses in the list.

BRIEF DESCRIPTION OF THE DRAWINGS

In the following several embodiments, the invention will be described in more detail by referring to the following figures.

DETAILED DESCRIPTION OF THE PRESENTLY PREFERRED EMBODIMENTS

Figure 3:
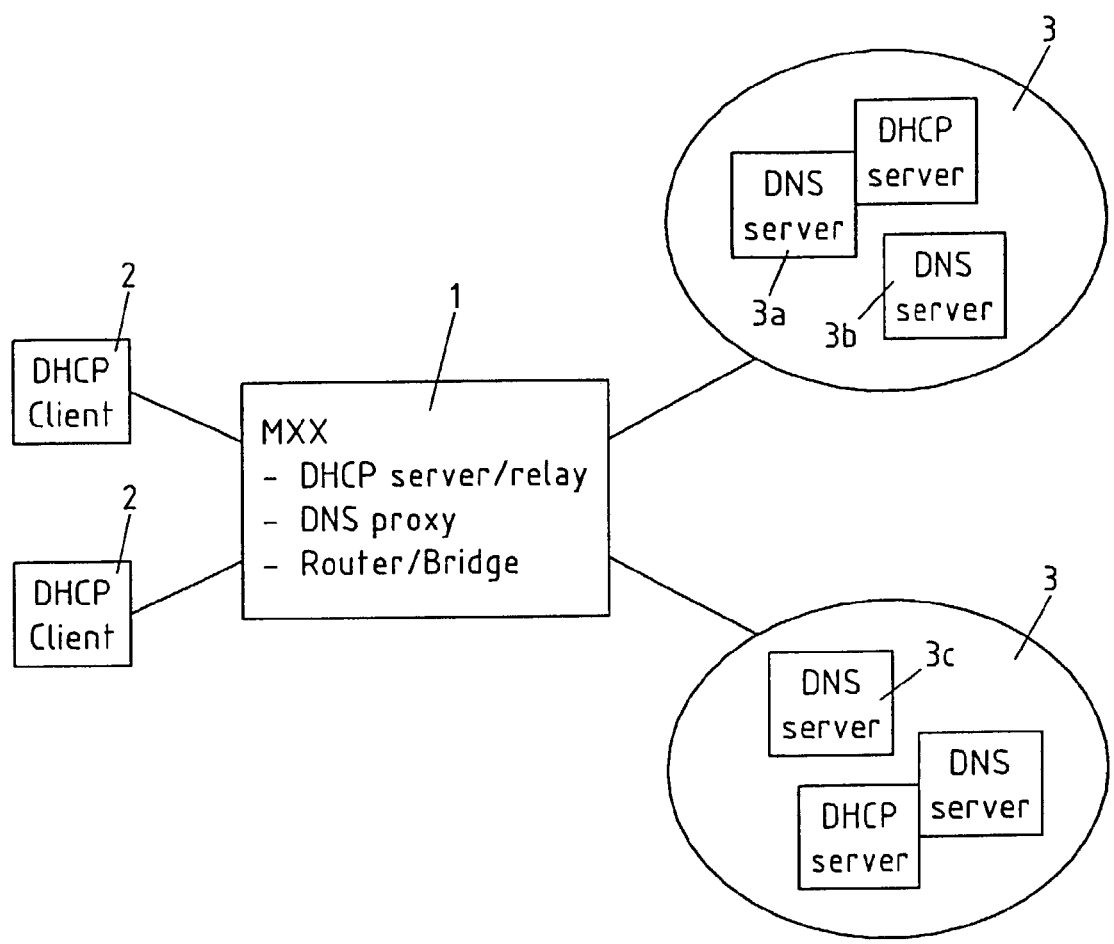
FIG. 3 shows a system known in the art.

The hardware of the system shown in FIG. 3 corresponds to the hardware of the system on which the present invention is based. However, the operation of the ADSL terminal Mxx, and in particular of the DHCP server, hereinafter just referred to as server, and of the client differs from the operation known in the art.

Figure 1:
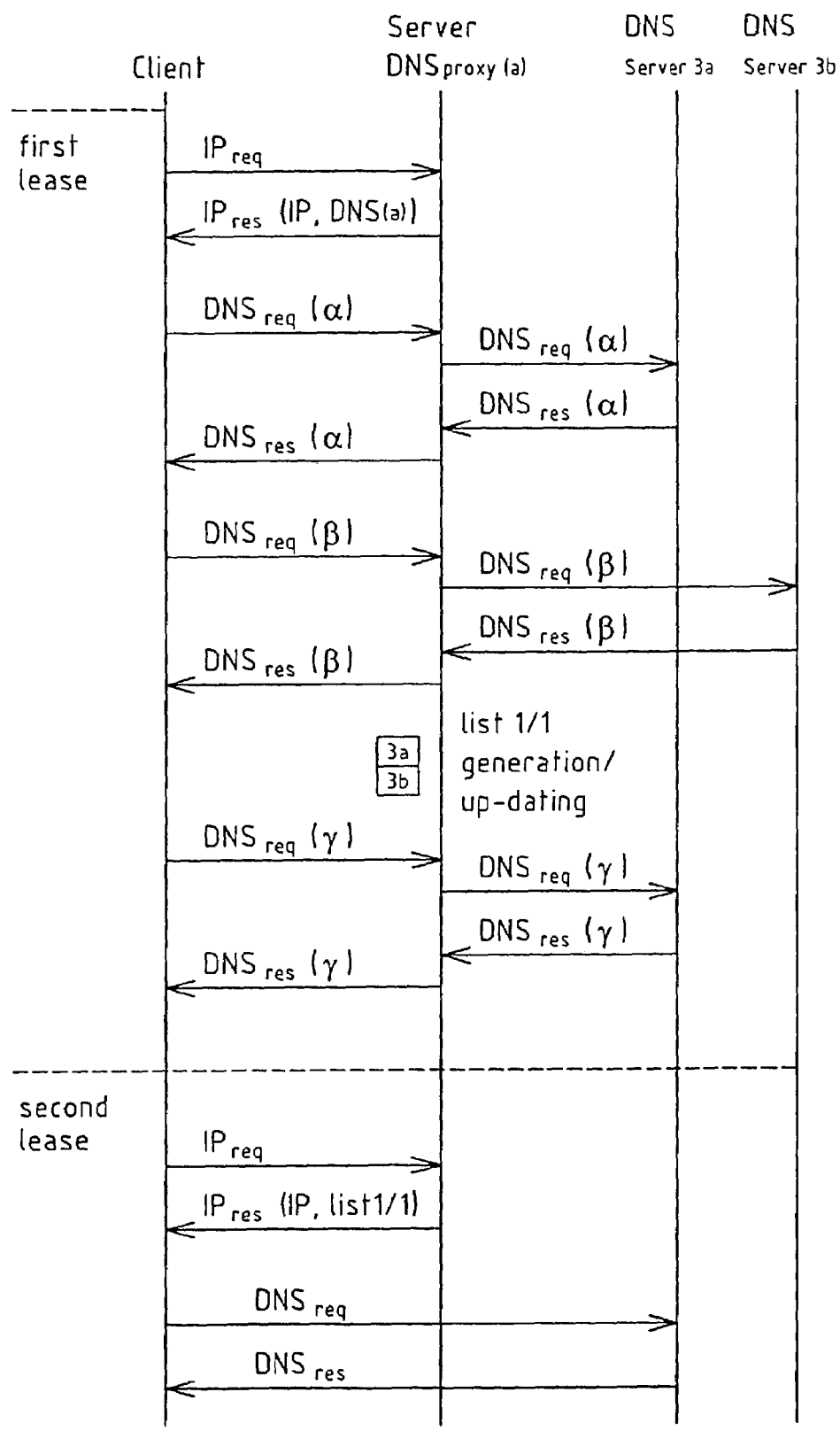
FIG. 1 shows a first embodiment of the method according to the invention.

FIG. 1 shows a first embodiment of the method according to the present invention. According to that embodiment at the beginning of a first lease time the client requests an IP address using DHCP (DHCP: Dynamic host configuration protocol)

from the server. The server responds said request by assigning an IP address and—as DNS address—the address of the Mxx itself to the client. During normal operation the server would not provide said Mxx-address to the client but an updated or optimised list of available DNS servers. However, in the embodiment according to FIG. 1 it is assumed that at the beginning of the first lease time such a list is not yet available and moreover it is assumed that the Mxx acts as DNS proxy (for the operation of the DNS proxy see the description above).

Since the DNS proxy looks to the client as a DNS server the client addresses each of its DNS requests α, β, γ to the DNS proxy. The DNS proxy may forward a first DNS request α received from the client to an appropriate real DNS server 3a in the internet or an intranet. Further the DNS proxy will forward a response to the request α received from DNS server 3a back to the client. The DNS proxy may quite similar handle a second DNS request β from the client with the only difference that the proxy does not forward said request to the DNS server 3a but to another appropriate DNS server 3b. Further DNS requests form the client may be forwarded to these or other DNS servers.

During the first lease time the server, in particular the DNS proxy measures the answer delays and/or the loss rate of said different real DNS servers 3a, 3b and evaluates the measured delays or loss rates in order to define a ranking of said DNS servers. More specifically the DNS proxy determines which of the servers has provided the best responses in the view a predetermined criterion. That criterion may for example be the speed of the server when answering a request or the reliability of its responses. The ranking of the real DNS servers in the internet or an intranet is displayed in a list; e.g. at the first position in the list there is mentioned the best of said DNS servers.

According to the method described according to FIG. 1 the DNS proxy forwards different requests from the client to different appropriate DNS servers. However, alternatively to the method illustrated, there is the possibility (not shown in FIG. 1) that the DNS proxy forwards one received DNS request, for example the request α, not only to server 3a but also to other appropriate DNS servers. In that case different DNS servers receive the same DNS request and the DNS proxy evaluates the responses of said different servers in order to determine the ranking of said DNS servers. Similar as described above the determined ranking is displayed in the list.

Returning back to FIG. 1 it is assumed that the DNS proxy has detected that the DNS server 3a is the best one and consequently, that DNS server 3a is placed at the first position of the list 1/1. The responses of the DNS server 3b are considered to be not as good as the responses of the DNS server 3a in the view of the predetermined criterion, e.g. the server speed, with the result that the DNS server 3b is placed at the second position in said list 1/1.

The update interval is independent of the lease time although it might correlate with the lease time. There might be several clients associated with the particular server with different lease times/lease periods.

Upon that list has been generated the DNS proxy optimises the handling of subsequent DNS requests received from the client in the way that it forwards subsequent requests, for example DNS request γ only to the best DNS server, that means to DNS server 3a in the embodiment according to FIG. 1.

The first lease time for the client may for example be one hour. When the client subsequently renews the release the server answers a new IP request from the client by assigning a new IP address together with said now available list 1/1 to the client (see the beginning of the second lease time). Now the client is enabled to directly put its DNS requests to the best available real DNS server known from the list 1/1, which is in the embodiment according to FIG. 1 DNS servers 3a. Since the list 1/1 is updated the client may rely on the fact that at a predetermined position in the list, preferably at the first position, the currently best available DNS server is mentioned. In that way the client has immediate access to the best available server and consequently the delay between a DNS request from the client and its co-ordinated response from an addressed DNS server is minimised.

Usually, but not necessarily, at the last position of the list there is mentioned that DNS server which is slowest or has the least reliability or has currently gone down.

Figure 2:
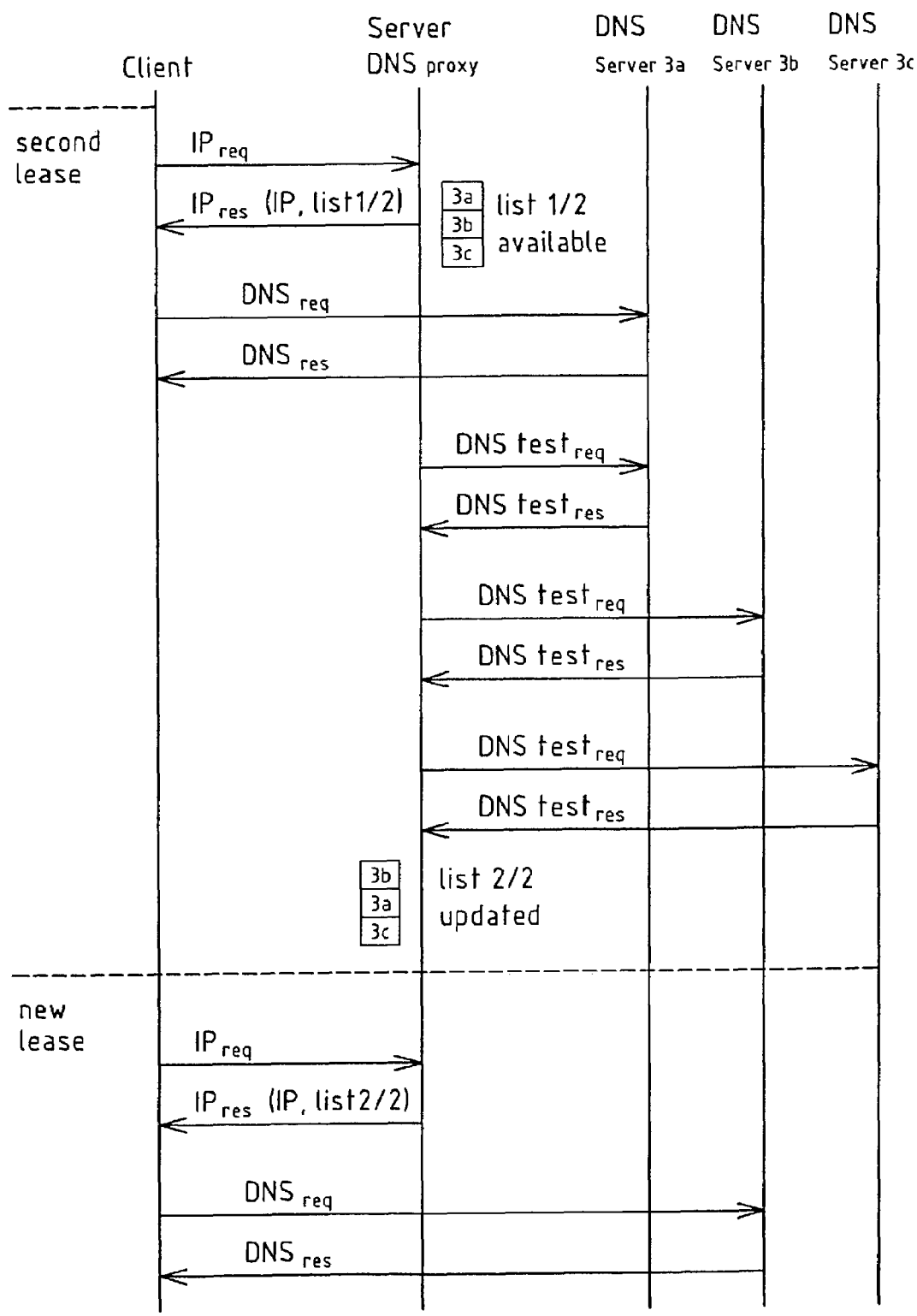
FIG. 2 shows a second embodiment of the method according to the invention.

FIG. 2 shows another possibility for determining the current ranking of available DNS servers. More specifically it is described as to how said list of available DNS server addresses is regularly updated during normal operation of the client server system. It is assumed that at the beginning of a lease time, for example the second lease time, as mentioned above with regard to FIG. 1, an optimise list, hereinafter referred to as list 1/2, is available and that said list is provided to the client in response to an IP request at the beginning of said lease session. When the client wants to output an DNS request he looks up said list 1/2, picks up the best available DNS server, here DNS server 1, therefrom and addresses said DNS request directly to said best DNS server.

However, during normal operation of the system according to FIG. 3 the ranking of the DNS servers may change because of overload or drop out of one or more DNS servers. In that case it is advantageous if the system is able to update the ranking of the DNS servers during normal operation. In order to achieve this it is proposed in FIG. 2 that the server or the DNS proxy on a regular basis, e.g. once an hour updates the DNS server list order based on the response times of said DNS servers upon receipt of at least one test request, respectively.

In the embodiment according to FIG. 2 it is assumed that the evaluation of the responses provided by the DNS servers to test requests results in a new ranking of said DNS servers wherein DNS server 3b is considered the best one. Consequently list 1/2 is replaced by list 2/2 wherein the currently best DNS server 3b is mentioned at the first position.

In a subsequent new lease session said updated list 2/2 is forwarded to the client in response to a IP request. Analog to the method as mentioned above the client will now address DNS requests directly to DNS server 3b indicated in the list 2/2 as the currently best available DNS server.

Alternatively to the mode of operation providing test requests to the different DNS servers and evaluating the responses thereof the ranking of the DNS servers may be updated by using another mode of operation. According to that other mode of operation the Mxx may monitor at least several of the DNS requests passing through it when the client directly addresses a DNS request to a DNS server. The Mxx may then—based on the response time—update the order of the DNS server addresses in said list.

The Mxx may serve clients also as DHCP relay agent. DHCP requests are related to at least one separate DHCP server. The DHCP responses from the DHCP servers are passed to local networks. The DNS servers may be learned from said responses and be sorted and included in the list. Other known or learned DNS servers might also be added to the list.

With the Mxx it is possible that there are several VCC open, i.e. several IP addresses. There are usually 2-3 DNS servers available per channel. There might be a channel to the public internet and another to the intranet of a company. With this invention it is possible to use the company's DNS server while browsing in the internet, if the company's DNS server is the best.

According to another embodiment of the invention notification messages may be send to the client.

According to another embodiment the client requests lease time, the DNS list and other options at the beginning of a session with a DHCPDISCOVER message from the server. In reply to said request the server offers an address and options to the client with a DHCPOFFER message. Subsequently, the client requests an address with a DHCPREQUEST message. In reply to said request the server confirms an address allocation with a DHCPACK message. Then the client starts a renew lease at the half of a given lease time with a DHCPREQUEST message. The server responds with a DHCPACK message. The updated DNS list may be delivered to the client when the server responds with DHCPOFFER and/or DHCPACK message. If the client has not requested the DNS server list (request for comments rfc 2132 options 55 and 6 as defined by the Internet Engineering Task Force IETF) then the server may give a long lease time to the client because in that case the client does not use DNS.

The RFCs can be found, for example, at ftp://ftp.isi.edu/in-notes/rfcNNNN.txt, where NNNN is the number of the RFC (i.e. ftp://ftp.isi.edu/in-notes/rfs2132.txt in our case). The DHCP protocol is described in ftp://ftp.si.edu/in-notes/rfc2131.txt where also the messages DHCPDISCOVER, DHCPOFFER, etc. are explained. The DNS is explained in RFC1034 and RFC1035. More information about the RFCs can be found at http://www.ietf.org.

A short lease time causes much network traffic. To the contrary, long lease time causes long un-updated list usage time. Advantageously the server list is broadcast to all clients when the list has changed.

The server could broadcast a DHCPACK notification with the updated list. Unfortunately, DHCP clients discard ACKs if they are not waiting for messages or if arrived messages are not for them (see rfc 2131). If the chaddr-field (client's hardware address) were filled with the broadcast address and if the ciaddr-field as well as the yiaddr-field of the message would be filled with zero by the server then the client could understand that the message is not a real ACK but contains informational notification. This feature should be added to the client.

The terms ciaddr and yiaddr are explained and used in the RFC2131, ciaddr refers to "Client IP address", yiaddr refers to "Your IP address" in the DHCP protocol. More information can be found in the RFC.

DHCPACK could be also unicasted to the client. It reduces broadcast traffic and the messages can be sent only to selected clients. The server may keep book how the clients lists are sorted and which clients are using DNS. Updates may be sent only to these clients who need it. If wanted, the client could inform the server with vendor specific information (see option 43) that it understands and wants notification ACKs. For the same purpose the server may send notifications only to registered clients.

What is claimed is:

1. A method comprising:
   receiving, at a server, an internet protocol address request from a client;
   assigning an internet protocol address to the client and causing a domain name system server address list to be provided from the server to the client in response to the request; and
   automatically and dynamically updating an order of addresses in the domain name system server address list provided to the client in accordance with a predetermined criterion,
   wherein, updating the domain name system server address list includes acting as a domain name system proxy, causing regular sending of at least one test request to each available domain name system server, and evaluating co-ordinated responses to the at least one test request in view of the predetermined criterion,
   wherein the predetermined criterion comprises a speed that a domain name system server requires to respond to a domain name system request and a loss rate of the domain name system server,
   wherein the domain name system server that is evaluated as best fulfilling the predetermined criterion is placed first in the order of addresses in the domain name system server address list, and
   wherein updating the domain name system server address list further includes monitoring at least some domain name system requests directed by the client via the server directly to several domain name system servers and evaluating co-ordinated responses to the at least some domain name system requests in view of said predetermined criterion.

2. The method of claim 1, wherein the client is configured to request an internet protocol address from the server using dynamic host configuration protocol.

3. An apparatus comprising:
   at least one storage area configured to store server program data to be interpreted by a server, said server program data configured to enable the server to:
      evaluate an internet protocol address request received from a client,
      generate a domain name system server address list that is automatically and dynamically sorted in accordance with a predetermined criterion,
      assign an internet protocol address to the client, and
      cause the sorted domain name system server address list to be provided to the client,
      wherein, to generate the domain name system server address list, the server program data is configured to enable the server to:
         act as a domain name system proxy,
         cause regular sending of at least one test request to each available domain name system server, and
         evaluate co-ordinated responses to the at least one test request in view of the predetermined criterion;
      wherein the predetermined criterion comprises a speed that a domain name system server requires to respond to a domain name system request and a loss rate of the domain name system server;
      wherein the domain name system server that is evaluated as best fulfilling the predetermined criterion is placed first in the domain name system server address list; and
      wherein, to generate the domain name system server address list, the apparatus is further directed to monitor at least some domain name system requests directed by the client via the server directly to several domain name system servers and evaluate co-ordinated responses to the same domain name system requests in view of said predetermined criterion.

4. An apparatus comprising:
   a computer readable storage medium comprising computer executable instructions that, when executed by a processor, cause the processor to perform the following:

receiving an internet protocol address request from a client;

assigning an internet protocol address to the client;

causing a domain name system server address list to be provided from the server to the client in response to the request; and automatically and dynamically updating an order of addresses in the domain name system server address list provided to the client in accordance with a predetermined criterion;

wherein, to update the domain name system server address list, the instructions cause the processor to perform:

acting as a domain name system proxy;

regular sending at least one test request to each available domain name system server; and evaluating coordinated responses to the at least one test request in view of said predetermined criterion;

wherein the predetermined criterion comprises a speed that a domain name system server requires to respond to a domain name system request and a loss rate of the domain name system server;

wherein the instructions further cause the processor to perform placing a domain name system server that is evaluated as best fulfilling the predetermined criterion first in the order of addresses in the domain name system server address list; and wherein the instructions for updating the domain name system server address list further cause the processor to perform monitoring at least some domain name system requests directed by the client via the server directly to several domain name system servers and evaluating coordinated responses to the at least some domain name system requests in view of said predetermined criterion.

5. The apparatus of claim 4 further comprising the processor.

* * * * *